Dec. 2, 1947.   A. H. SANBORN   2,432,070
SYNCHRONOUS MOTOR
Filed Dec. 18, 1944
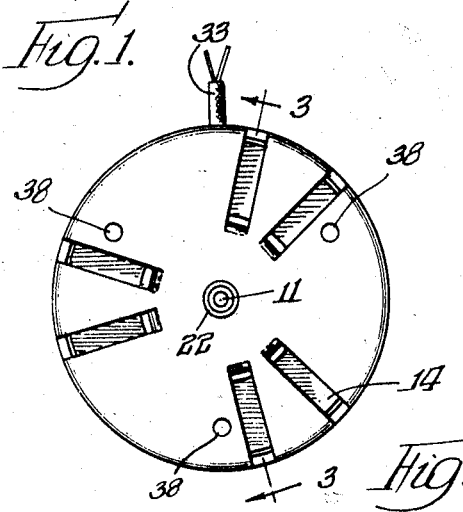
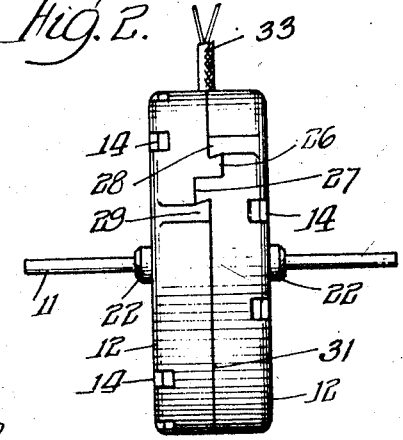
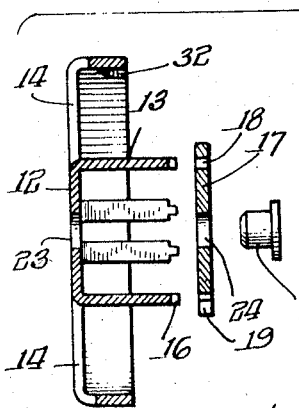
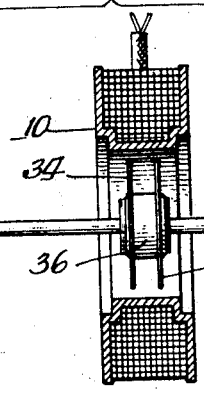
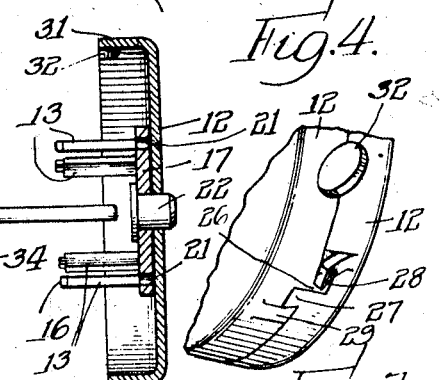
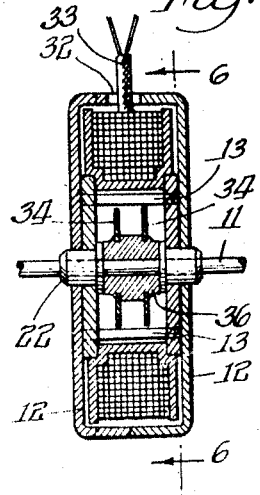
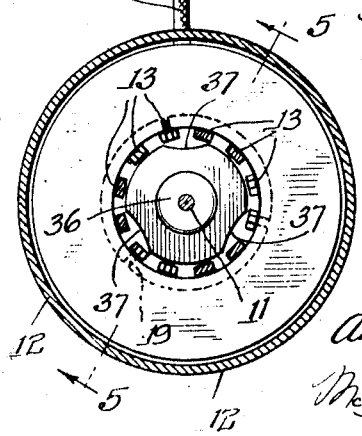
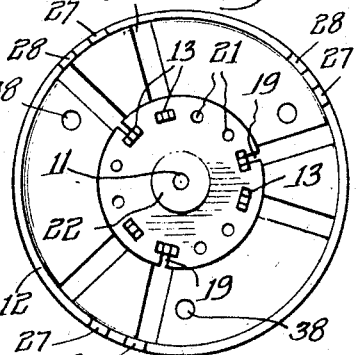
INVENTOR.
Arthur H. Sanborn
BY Patented Dec. 2, 1947

2,432,070

UNITED STATES PATENT OFFICE 2,432,070

SYNCHRONOUS MOTOR

Arthur H. Sanborn, Chicago, Ill.

Application December 18, 1944, Serial No. 568,665

4 Claims. (Cl. 172—278)

My invention relates to an improved self-starting fractional horsepower A. C. synchronous motor.

In many arts in which the control of time and the application of power are required, such as in the electrical clock art, small fractional horsepower synchronous motors are employed. Preferably such motors are of a self-starting type and it is to this type of a fully synchronous motor that my invention relates. Motors of this type are required to start promptly when the motor field coil is energized, the rotor is required to come up to speed quickly and synchronism must be maintained during the entire period of operation. Those skilled in the art understand that in a relatively small motor of this type, in which the rotor comprises essentially a simple disc-like member formed of paramagnetic material mounted on a shaft, provision of the self-starting feature by means of shading coils and the like generally results in marked loss of power and at times in a tendency toward slippage when the relation of load to torque approaches unity. Motors of the type identified are frequently required to be housed in a relatively small space, and for this and other reasons reduction of size with a minimum reduction in torque is an important desideratum. The main requirements of quick starting and truly synchronous operation complicate the problem of production at a reasonable cost of a type of motor which, considering its relative simplicity from a mechanical standpoint, should be relatively inexpensive to produce.

The principal object of my invention is the provision of a self-starting truly synchronous motor which, from the standpoint of cost and performance, including torque, represents a marked improvement over similar motors heretofore known.

Another object is the provision of such a motor wherein parts, their manner of production and their manner of assembly is simplified and a number of the important parts lying on opposite side of the rotor are made identical with each other without sacrifice of performance characteristics.

Still another object is the provision of a small synchronous motor of a type employing a co-axial field coil, wherein the stator construction is greatly simplified, portions thereof comprising duplicate parts and improved operating characteristics thereof obtained.

A further object is to provide a motor of the type identified wherein the stator pole pieces are integral with the casing and the highest flux density is carried by parts comprising a solid or integral metallic construction.

A still further object is the provision of a motor of the type identified in which duplicate sections of casing carry integral pole pieces and the construction and relationship of the pole pieces and casing is such that greatest flux density exists in continuous metal parts, and points of lower flux density in which the total amount of flux per unit area is reduced, comprise discontinuous non-integral structures.

Still another object is the provision of an improved rotor construction.

Other specific objects and features of my invention will be apparent from a consideration of the following detailed description taken with the accompanying drawings wherein—

Fig. 1 is a front elevational view of a motor constructed in accordance with my invention, the drawing illustrating the motor as considerably enlarged over that which would normally be used to drive a clock mechanism, the enlargement being for the purpose of showing the construction and clearly bringing out the relationship of the parts;

Fig. 2 is a side elevational view of the motor shown in Fig. 1;

Fig. 3 is a generally vertical sectional view taken on the line 3—3 of Fig. 1 looking in the direction of the arrows, several of the parts being shown in elevation and some of the parts being broken away in order to show the structure of individual parts and sub-assemblies;

Fig. 4 is a fragmentary perspective view of the edge of the casing before the two parts thereof are secured together;

Fig. 5 is a sectional view generally similar to Fig. 3 with the parts in assembled position, with the rotor shown in section and ends of the rotor shaft cut away to conserve space;

Fig. 6 is a sectional view taken just inside of one of the casings with the rotor and field coil shown in elevation, but with the pole pieces shown in section to illustrate their number and position; and Fig. 7 is an elevational view looking into one of the casings showing the pole pieces and the shading slug in their relative positions.

In accordance with the general features of my invention, I provide a field coil 10 co-axial with a rotor shaft 11 disposed between a pair of identical casing members or half casings 12. Each half casing 12 is provided with a plurality of pole pieces 13 formed by partially cutting away the casing to leave generally rectangular radial slots 14, and bending the material so cut away to form the said pole pieces. In the embodiment of the invention shown in the drawings, there are six pole pieces for each of the casings 12 but, as will be made clear, these pole pieces are disposed in pairs and one of each pair is shaded. A pair of pole pieces comprising a shaded and unshaded pole functions as a single pole; so that, when six such pole pieces are carried by each casing, the assembled motor will have six poles. While the features of my invention may be utilized in a motor having a number of poles other than six, I shall, in later portions of the description, allude specifically to the number of pole pieces and related parts, in order to simplify an understanding of the particular embodiment shown.

Each half casing 12 is formed of magnetic material, optionally any suitable mild steel which can be formed accurately by conventional die operations. The casing is formed from a blank of sheet metal by a drawing and blanking operation; and the pole pieces 13, six in number, on each casing, are formed up to be truly concentric with the shaft 11 and to fit snugly within the field coil 10 when the parts are subsequently assembled. Each of the pole pieces has a short narrowed end 16 comprising and end projection, adapted to project into oppositely disposed apertures of a shading slug to position and hold the outer end thereof, as will be described.

Associated with the six pole pieces on each casing 12 is a shading slug 17, formed of an electrically conductive diamagnetic material such as copper. This slug 17 is provided with six apertures 18 which fit snugly around the pole pieces 13 in the manner illustrated particularly at the right hand side of Fig. 3. The apertures 18 are, of course, arranged in pairs in the same manner as the pole pieces 13 as appears particularly clear from Fig. 7. A slot 19 is connected to one of each pair of apertures and leads to the periphery of the slug 17. Thus, of each pair of pole pieces, one is entirely surrounded with copper and therefore comprises a "shaded" pole piece; while its companion pole piece has the copper extending only partly around its base and is therefore "unshaded." The arrangement at both sides of the motor, that is in connection with both casings 12, is the same, the two sides of the stator being for all practical purposes identical as previously noted. The sole exception is in the manner of assembling the identical slugs with the identical casings to cause one sub-assembly to be in part a mirror image of the other, as will be explained later. Between each pair of apertures 18 is a pair of round smaller apertures 21 adapted to receive the short narrowed ends 16 of the pole pieces on the opposite sub-assembly. The length of the narrowed end portion or projection 16 may be approximately half the thickness of the shading slug 17. Thus suitable reluctance is introduced into the magnetic path formed between the casings 12 by the pole pieces 13, and a better distribution of flux and rotation thereof is obtained in such a way as to be capable of starting and driving of the rotor.

In producing the motor of my invention, the shading slug 17 of copper or the like is forced down over the pole pieces 13 of the pre-formed casing 12 relatively tightly to form a sub-assembly. This sub-assembly is completed by the insertion of a bearing 22 for the rotor shaft 11, this bearing 22 preferably being of the so-called "oilless" type. While the shading slug 17 may be frictionally held in contact with the pole pieces 13 and in turn carry the bearing 22, I find it suitable to provide merely a relatively tight fit between these parts and force the bearing 22 frictionally into an opening 23 in the half casing 12 to hold it in position. The slug 17 has a center opening 24 through which the bearing 22 extends, but preferably the bearing is loose in the opening 24 but tight in the opening 23. Thus manufacturing tolerances for alignment are calculated from the casing 12 rather than from the slug 17.

I have previously referred to the identical construction of the half casings 12. Notwithstanding this fact, I provide integral fastening means for securing the casings together in assembled relation without the use of separate means such as screws, lugs, clamps or the like. Such fastening means comprises equally spaced integral projections 26 and 27 on each half casing 12 adapted to engage in oppositely disposed edge slots in the opposite half casing. To facilitate such engagement of the projections in the slots, I provide tongues 28 and 29 above and below the pair of projections, said tongues extending from near the face of the half casing 12 up to the rims 31 defining the dividing line between the casings. By studying Fig. 2 it will be seen that the dividing line between the half casings comprises a median line to which the tongues 28 and 29 extend but that the projections 26 and 27 extend beyond such median line. To facilitate bringing the casings together, the contiguous edges of projections 26 and 27 are made directly perpendicular to the rims 31. The tongues 28 and 29 may be originally formed to be separated a substantial distance from the remaining portion of the casing as shown in Fig. 4. By placing the assembled motor in a suitable jig, which permits it to be squeezed around its periphery, all of the tongues 28 and 29 may be squeezed into position to complete the assembly.

In further reference to the identical character of the casings 12, it should be noted that the radial slots 14 appearing in Fig. 1 are six in number and arranged in the form of three sets of two each. Since the half casings 12 are identical, the slots on the opposite half casings are identical, but when the half casings are brought together the pairs of slots of one half casing are disposed between the pairs of slots of the other half casings. If all of the slots of both half casings 12 are taken into consideration there will be twelve such slots disposed equally around the circumference of a circle. From these slots the pole pieces 13 are formed as shown in Fig. 6 and, therefore, there are twelve of such pole pieces arranged symmetrically and at suitable positions about the center of the motor as defined by the axis of shaft 11. The shading slugs 17 are also identical but they are placed on their respective pole pieces in relatively reversed positions in the two sub-assemblies, so that when the two resulting sub-assemblies are brought together the slots 19 are disposed at every other pole piece. The pole pieces, therefore, are alternately shaded and unshaded, and each pair comprising an unshaded and shaded pole piece is in effect a single pole, thereby making a total of six poles in all. It will be noted that an aperture 32 is provided for passage of the leads 33 to the windings of coil 10. Aperture 32 is formed by two semi-circular apertures, one in the rim of each half casing 12, and assembly of the two sub-assemblies, with proper alignment of the pole pieces, is automatically obtained by bringing the two portions of the aperture 32 together.

While the motor of my invention may employ any one of several forms of rotors, I have found very excellent results to be obtained by the use of a rotor having two steel discs 32 carried by hub 36 comprising a screw machine or like produced part pressed onto the shaft 11. The discs 34 may be secured in any suitable manner such as by pressing, swedging, staking and the like. Each of the discs 34 should be made quite thin to obtain the best results. A motor approximately two-thirds the size of that shown in the drawings may employ rotor discs 34 which are between 0.010 and 0.015 of an inch thick. Edge cuts 37 or other suitable means are utilized to provide adequate reluctance between at least certain pole positions on the rotor discs. The use of three edge cuts as shown in Fig. 6, I have found to be particularly desirable. It will be noted that between any two pairs of edge cuts 37 there are two pole positions and these edge cuts should not be long enough to prevent the extreme circumferential edge of the discs from bridging at least approximately three pole positions or the circumference occupied by about one and a half poles. I have found this relationship to be eminently satisfactory in assuring self-starting and at the same time preventing slippage of the rotor and loss of speed thereof. While the number and shape of the discs may be modified, two discs arranged as shown seem to produce the best results, at least on a six pole motor. A rotor such as described with a stator such as described will, in other words, start rapidly, will maintain itself in synchronism and will operate satisfactorily under any usual conditions encountered with motors of this general type.

The motor shown in the drawings is stripped to its bare essentials and no means is shown either for making the motor water-proof, for connecting the shaft 11 to a gear or like object to be driven at suitable speed, in manners customary in the art. The motor of my invention may be mounted in a simple fashion by means of three mounting holes 38, which mounting holes may also be employed for the purpose of locating a half casing 12 during production and assembly operations. Other forms of mounting may, of course, be used. The size of the motor may be varied appreciably but in general it should be borne in mind that it is intended as a relatively very small type of motor consuming, for example, about two watts of electrical energy, suitable for use in driving clocks and the like. The half casings 12 may, as previously described, be formed of mild steel and the shading slugs 17 of copper. The rotor discs 34 are preferably made of hardened steel, preferably a suitable alloy steel, or a so-called eutectoid carbon steel, the hub 36 of brass and the shaft 11 of any suitable shaft material. The field coil 10 may be wound on a plastic or paper spool and usual engineering features utilized in the selection of wire to obtain the proper number of ampere turns. While the motor is particularly valuable when produced with six poles operated at 1200 R. P. M. on 60 cycle power, the number of poles may be increased or decreased with a consequent reduction or increase in rotor speed as the case may be. For the benefit of those skilled in the art, I wish to note that the distribution of pole pieces around the stator does not need to be uniform, as shown, but that I employ such uniformity in the drawings for convenience of design. It is in general desirable that the space between the shaded and unshaded pole pieces of a pair, be less than the space between successive pairs of pole pieces. I deem these elements of design to be understood by those skilled in the art, however. My invention permits such selection in the number and spacing of pole pieces as may be necessary or desirable in a given instance as those skilled in the art will well understand. My invention is defined in the claims.

What I claim as new and desire to protect by Letters Patent of the United States is:

1. A synchronous self-starting fractional horsepower motor comprising a motor housing composed of a pair of connected cup-shaped stampings constituting half casings, each having a plurality of integral pole pieces circumferentially disposed about a rotor and spaced therefrom by an air gap, said pole pieces of the two half casings together forming all of the stator poles, a shading ring around alternate pole pieces, a field coil coaxial with the rotor shaft and extending around said pole pieces, and a rotor rotatably disposed between said poles, said rotor having at least one disc the periphery of which defines a number of segments comprising pole positions each of approximately the length required to span three consecutive pole pieces and means providing some magnetic reluctance between at least certain of such positions.

2. The combination with the stator member of a synchronous self-starting fractional horse power motor having an even number of poles, but not less than six, each pole comprising a pair of pole pieces, the pole pieces being arranged in spaced relation to each other in the form of a hollow cylinder and one pole of each pair having shading means associated therewith, of a rotor member composed of a rotatable shaft within and at the axis of the cylinder and a pair of like, thin, hardened steel discs fixed to the shaft in spaced relation to each other, the periphery of each disc being cut away in regions the number of which is divisible in the number of poles, said regions being spaced at equal distances apart and of such angular lengths that each unmutilated peripheral portion is long enough to span at least three consecutive pole pieces.

3. The combination with the stator member of a synchronous self-starting fractional horse power motor having six poles each comprising a pair of pole pieces, the pole pieces being arranged in spaced relation to each other in the form of a hollow cylinder and one pole piece of each pair having shading means associated therewith, of a rotor member comprising a rotatable shaft and at least one disc of hardened steel fixed to the shaft, the periphery of the disc being cut away in three regions spaced at equal distances apart and of such angular lengths that each unmutilated peripheral portion is approximately long enough to span three consecutive pole pieces.

4. A motor housing for a synchronous self-starting fractional horse power motor comprising a pair of cup-shaped stampings constituting half casings abutting each other at their rims, a dovetail projection on each rim in position beside a notch to receive the projection on the other rim, and each rim containing a tongue, partially severed therefrom, defining one side of the corresponding notch, the parts being so proportioned that when the tongues are bent outwardly the half casings can be moved axially relatively to each other until the edges of their rims engage and be then locked together by bending the tongues inward into the positions which they originally occupied in the rims.

ARTHUR H. SANBORN.

REFERENCES CITED

The following references are of record in the file of this patent:

UNITED STATES PATENTS

| Number | Name | Date |
|---|---|---|
| 2,248,285 | Reinhardt | July 8, 1941 |
| 1,495,827 | Warren | May 27, 1924 |
| 1,818,330 | Horni | Aug. 11, 1931 |
| 1,959,391 | Spender | May 22, 1934 |
| 2,128,719 | Thompson | Aug. 30, 1938 |
| 2,169,901 | Poole | Aug. 15, 1939 |

FOREIGN PATENTS

| Number | Country | Date |
|---|---|---|
| 451,447 | Great Britain | Aug. 6, 1936 |
| 558,022 | Great Britain | Dec. 15, 1943 |